(12) United States Patent
da Silva et al.

(10) Patent No.: US 11,912,397 B2
(45) Date of Patent: Feb. 27, 2024

(54) THERMALLY CONFIGURABLE STRUCTURAL ELEMENTS ESPECIALLY USEFUL FOR AIRCRAFT COMPONENTS

(71) Applicant: EMBRAER S.A., São José dos Campos (BR)

(72) Inventors: Paulo Anchieta da Silva, São José dos Campos (BR); Fabio Santos da Silva, São José dos Campos (BR); Danillo Cafaldo dos Reis, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 0 days.

(21) Appl. No.: 17/975,046

(22) Filed: Oct. 27, 2022

(65) Prior Publication Data

US 2023/0057985 A1 Feb. 23, 2023

Related U.S. Application Data

(62) Division of application No. 16/200,298, filed on Nov. 26, 2018, now abandoned.

(51) Int. Cl.
*B22F 10/20* (2021.01)
*B64C 23/06* (2006.01)
(Continued)

(52) U.S. Cl.
CPC ............ *B64C 23/065* (2013.01); *B33Y 70/00* (2014.12); *B33Y 80/00* (2014.12); *B64C 23/072* (2017.05);
(Continued)

(58) Field of Classification Search
None
See application file for complete search history.

(56) References Cited

U.S. PATENT DOCUMENTS

| 7,744,038 B2 | 6/2010 | Sankrithi et al. |
| 8,110,050 B2 | 2/2012 | Smith et al. |
| 8,348,201 B2 | 1/2013 | Pecora et al. |
| 8,726,652 B1 | 5/2014 | Gunter |
| (Continued) | | |

OTHER PUBLICATIONS

C. Barnes, "Shape Memory and Superelastic Alloys", *Innovations*, Jul. 1999, 7 pages.

*Primary Examiner* — George Wyszomierski
(74) *Attorney, Agent, or Firm* — NIXON & VANDERHYE P.C.

(57) ABSTRACT

Thermally configurable structural elements (e.g., aircraft components such as an aircraft winglet spar) capable of assuming at least first and second structural configurations are provided whereby the structural element includes an integral actuation mechanism may be formed of sintered shape memory alloy (SMA) particles and sintered non-SMA particles formed by an additive layer manufacturing (ALM) process, such as 3D printing. The ALM process thereby provides by at least one thermally configurable region, and at least one non-thermally configurable region which is unitarily contiguous with the at least one thermally configurable region. The at least one thermally configurable region is capable of assuming at least first and second positional orientations in response to the presence or absence of a thermal input to thereby cause the structural element to assume the at least first and second structural configurations, respectively.

15 Claims, 5 Drawing Sheets

(51) Int. Cl.
   *B33Y 70/00* (2020.01)
   *B33Y 80/00* (2015.01)
   *F03G 7/06* (2006.01)
   *C21D 6/00* (2006.01)
   *B22F 10/28* (2021.01)
   *B22F 12/90* (2021.01)
   *B22F 10/64* (2021.01)
   *B64C 3/18* (2006.01)

(52) U.S. Cl.
   CPC .............. *C21D 6/004* (2013.01); *F03G 7/06* (2013.01); *B22F 10/20* (2021.01); *B22F 10/28* (2021.01); *B22F 10/64* (2021.01); *B22F 12/90* (2021.01); *B22F 2301/15* (2013.01); *B64C 3/185* (2013.01); *C21D 2201/01* (2013.01); *Y02T 50/10* (2013.01)

(56) References Cited

U.S. PATENT DOCUMENTS

| | | | |
|---|---|---|---|
| 9,388,078 B2 | 7/2016 | Rael | |
| 10,065,240 B2 | 9/2018 | Chen | |
| 10,894,596 B2 | 1/2021 | Saucray | |
| 2008/0308683 A1 | 12/2008 | Sankrithi | |
| 2010/0025538 A1 | 2/2010 | Hamilton | |
| 2013/0309089 A1 | 11/2013 | Madsen | |
| 2016/0016355 A1 | 1/2016 | Marcoe | |
| 2016/0047255 A1* | 2/2016 | Vargas | B23K 15/0086 219/76.1 |
| 2016/0251736 A1* | 9/2016 | Shimizu | B22F 10/366 419/7 |
| 2016/0354976 A1* | 12/2016 | Zhang | B22F 3/1007 |
| 2017/0246682 A1* | 8/2017 | Duerig | A61F 2/4455 |
| 2020/0047875 A1* | 2/2020 | Calkins | B64C 21/08 |
| 2021/0121949 A1* | 4/2021 | Steele | B22F 3/20 |

* cited by examiner

THERMALLY CONFIGURABLE STRUCTURAL ELEMENTS ESPECIALLY USEFUL FOR AIRCRAFT COMPONENTS

CROSS-REFERENCE TO RELATED APPLICATION

This application is a divisional of U.S. application Ser. No. 16/200,298 filed on Nov. 26, 2018 (now abandoned), the entire contents of which are expressly incorporated herein by reference.

FIELD

The embodiments disclosed herein relate generally to thermally configurable structural elements that are adapted and capable of assuming at least first and second structural configurations. In especially preferred forms, the thermally configurable structural elements may be embodied in an aircraft component, e.g., an airfoil structure such as a winglet.

BACKGROUND

Several types of structural components are conventionally designed to experience various operation loads during their useful life which may promote conflicting objectives in obtaining better operational performance. By way of example, aircraft wings with large spans exhibit good range and fuel efficiency but lack maneuverability and have relatively low cruising speeds. On the other hand, aircraft wings with low aspect ratios may provide faster cruse speeds and greater maneuverability but exhibit low aerodynamic efficiency. Modifying the aerodynamic configurations of such aircraft wings could therefore allow for the design of an aerodynamic structure having a greater operational envelope and aerodynamic efficiencies.

Traditional actuators that may be employed to modify the aerodynamic characteristics of an aircraft component generally use hydraulics, pneumatics or electrical motors to actuate the configurable structural components. However, such traditional actuator systems can be heavy and prone to failure over time due to pressures, stresses or quantity of moving parts. Some alternatives to traditional actuators use thermally actuated shape memory alloys (SMAs) to transition a structural component between at least two different stable configurations. Generally, SMAs have two preformed stable configurations which are achieved based on a material phase change at a specific temperature. As evidenced by U.S. Pat. Nos. 7,744,038; 8,110,050; 8,348,201 and 8,726,652 (the entire content of each such prior issued patent being expressly incorporated hereinto by reference), the preformed stable configurations attributable to structural components formed of SMAs have therefore been employed as actuators so as to cause the components to assume different configurations in response to a thermal input.

In general, conventional SMA actuator parts are limited to relatively simple structural shapes, e.g., rods, bars, tubes, plates, cables and the like that may be fabricated from conventional SMA billet, rod, fiber and bar stock shapes. As a result, therefore, relatively complex structural components having so-called "smart" thermally configurable orientations which allow the structural component to morph as may be required during use have not been provided.

It would therefore be highly desirable if complex structural components could be provided with a SMA actuator to allow the structural component to assume various structural orientations in response to a thermal input. It is towards fulfilling such a need that the embodiments described herein are directed.

SUMMARY

The embodiments described herein are generally directed toward thermally configurable structural elements (e.g., aircraft components such as an aircraft winglet spar) capable of assuming at least first and second structural configurations are provided whereby the structural element includes an integral actuation mechanism provided by at least one thermally configurable region, and at least one non-thermally configurable region which is unitarily contiguous with the at least one thermally configurable region. The at least one thermally configurable region is capable of assuming at least first and second positional orientations in response to the presence or absence of a thermal input to thereby cause the structural element to assume the at least first and second structural configurations, respectively. The thermally and non-thermally configurable regions may be formed of sintered shape memory alloy (SMA) particles and sintered non-SMA particles formed by an additive layer manufacturing (ALM) process, such as 3D printing.

According to certain exemplary embodiments, the at least one thermally and non-thermally configurable regions may consist of 3D laser sintered shape memory alloy (SMA) particles and 3D laser-sintered non-SMA particles, respectively. The sintered SMA particles are comprised of Ni—Ti based alloys and/or Cu-based alloys, e.g., a shape memory alloy selected from the group consisting of Ni—Ti, Ni—Al, Cu—Zn, Cu—Zn—Al, Cu—Zn—Sn, Cu—Zn—Si, Cu—Zn—Ga, Au—Cd, Fe—Pt, Mg—Cu, Fe—Mn—Si—Cr—Ni. The sintered non-SMA particles may be formed of virtually any non-SMA material conventionally employed in the aerospace industry, e.g., aluminum alloys, magnesium alloys and/or titanium alloys. By way of example, when the thermally configurable structural component is embodied in an aircraft component, the sintered SMA particles may be formed of a shape memory Ni—Ti alloy, while the sintered non-SMA particles may be formed of a non-shape memory aluminum alloy.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

One exemplary and non-limiting embodiment of the invention described herein is depicted in FIGS. 1-5 in the form of angularly adjustable winglets 10 associated with an aircraft wing 12 of an aircraft AC. In certain flight conditions (e.g., cruise flight versus take-off and landings), it may be desirable for the winglet to assume at least first and second angular orientations relative to the wing 12 as shown in FIGS. 2A and 2B. Winglet spars 20 are provided in order to enable movement of the winglet 10 between different angular orientations relative to the lengthwise and/or chordwise extents of the aircraft wing 12 as shown by the angles $\alpha$ and $\beta$ in FIG. 2B) so as to allow bending and/or twisting of the winglet relative to the oncoming airflow.

Figure 1:
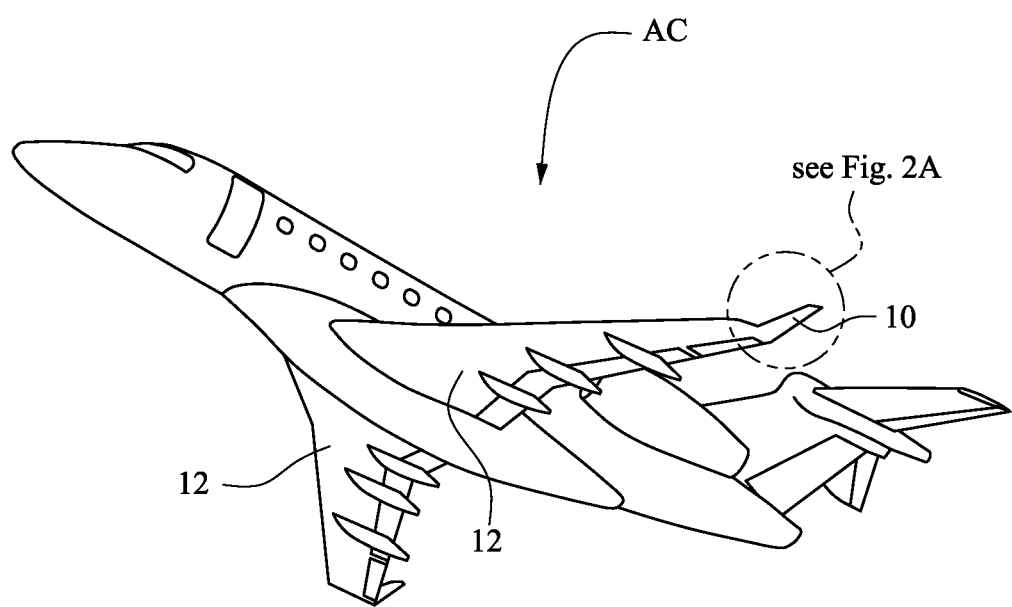
FIG. 1 is a perspective view of an exemplary aircraft which may embody a thermally configurable structural element as a component part of the aircraft winglet.
Figure 2A:
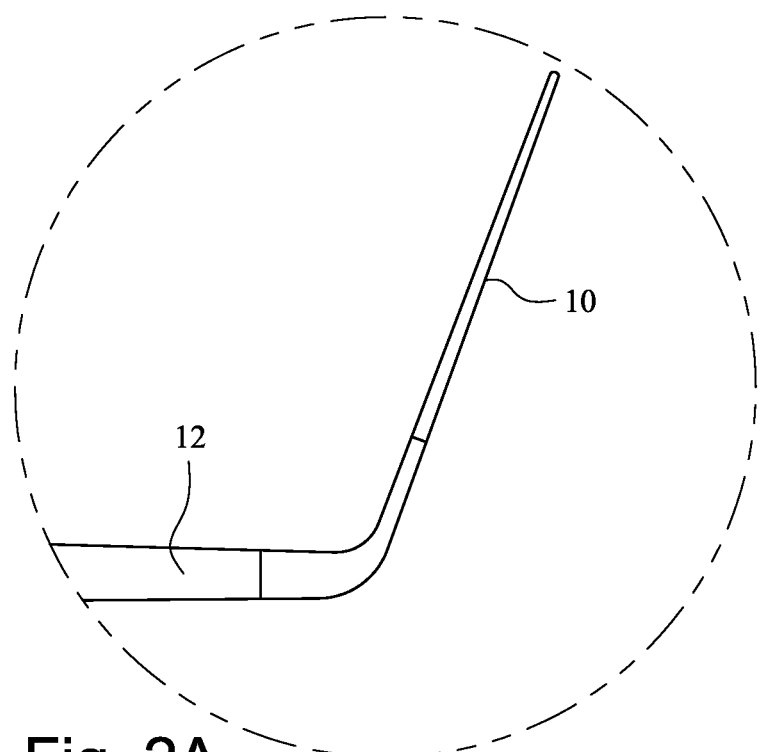
FIGS. 2A and 2B are enlarged views of the aircraft winglet depicted in FIG. 1 depicted in first and second structural configurations, respectively.
Figure 2B:
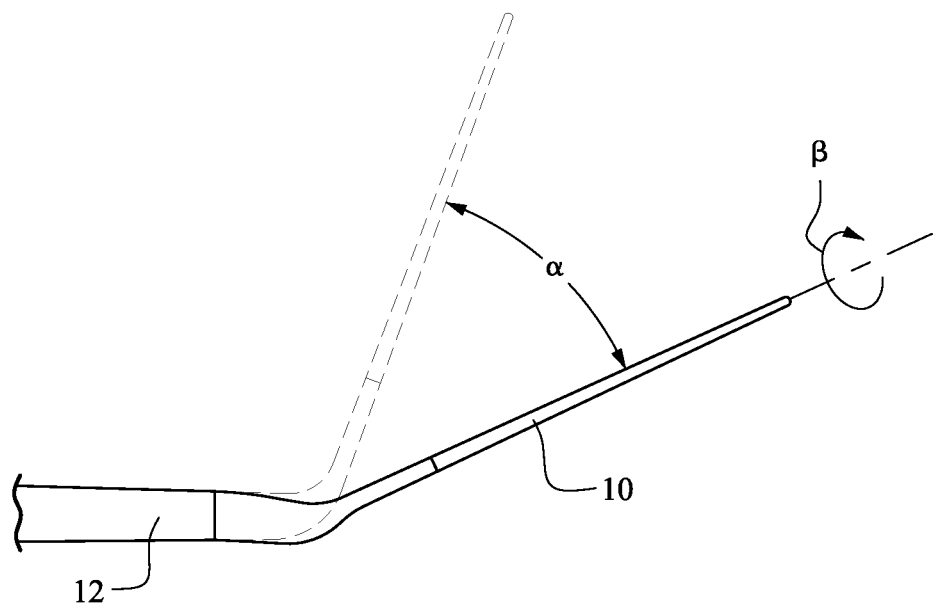
Figure 3:
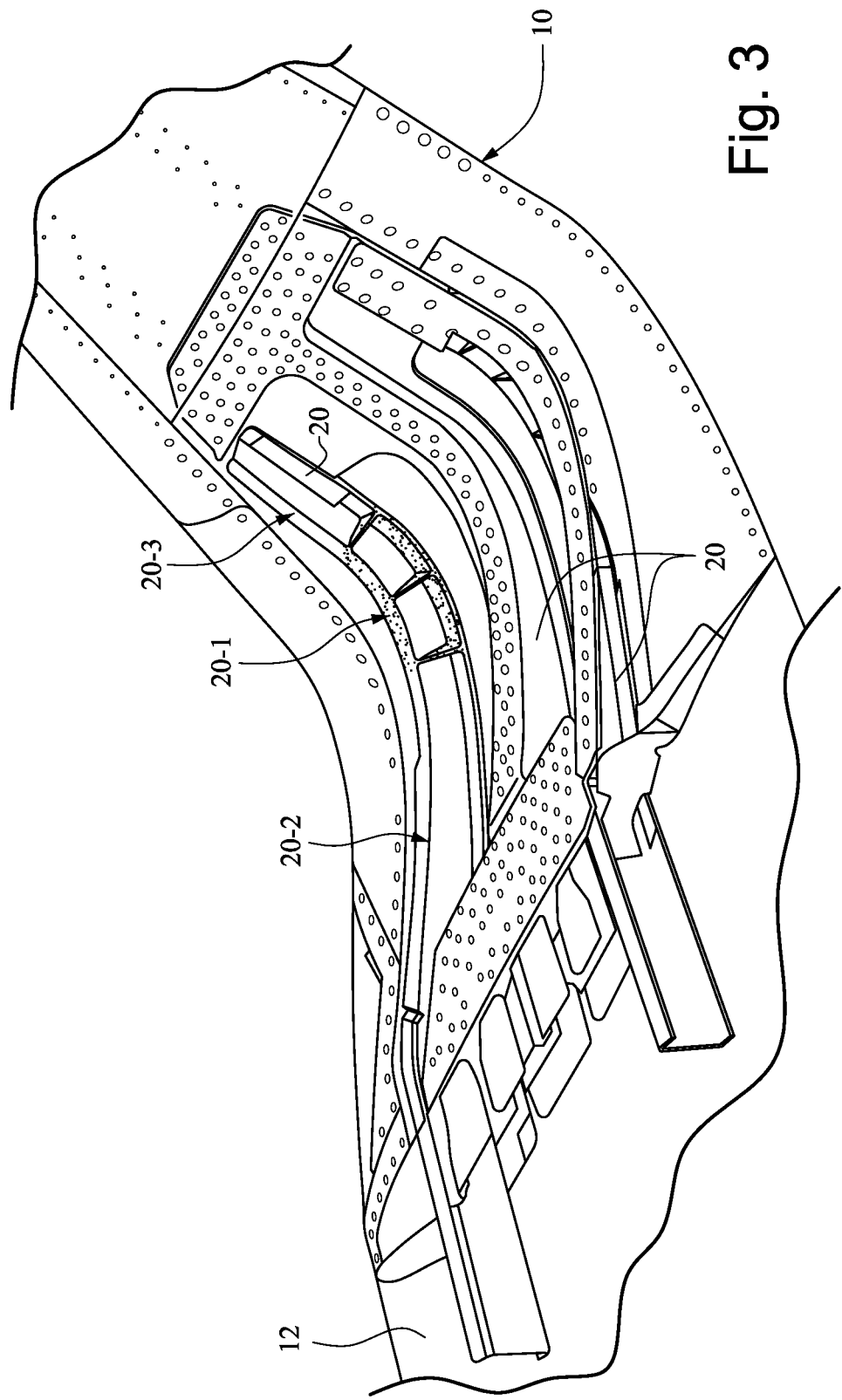
FIG. 3 is an enlarged perspective view of a portion of the aircraft winglet depicted with the wing skin removed.
Figure 4:
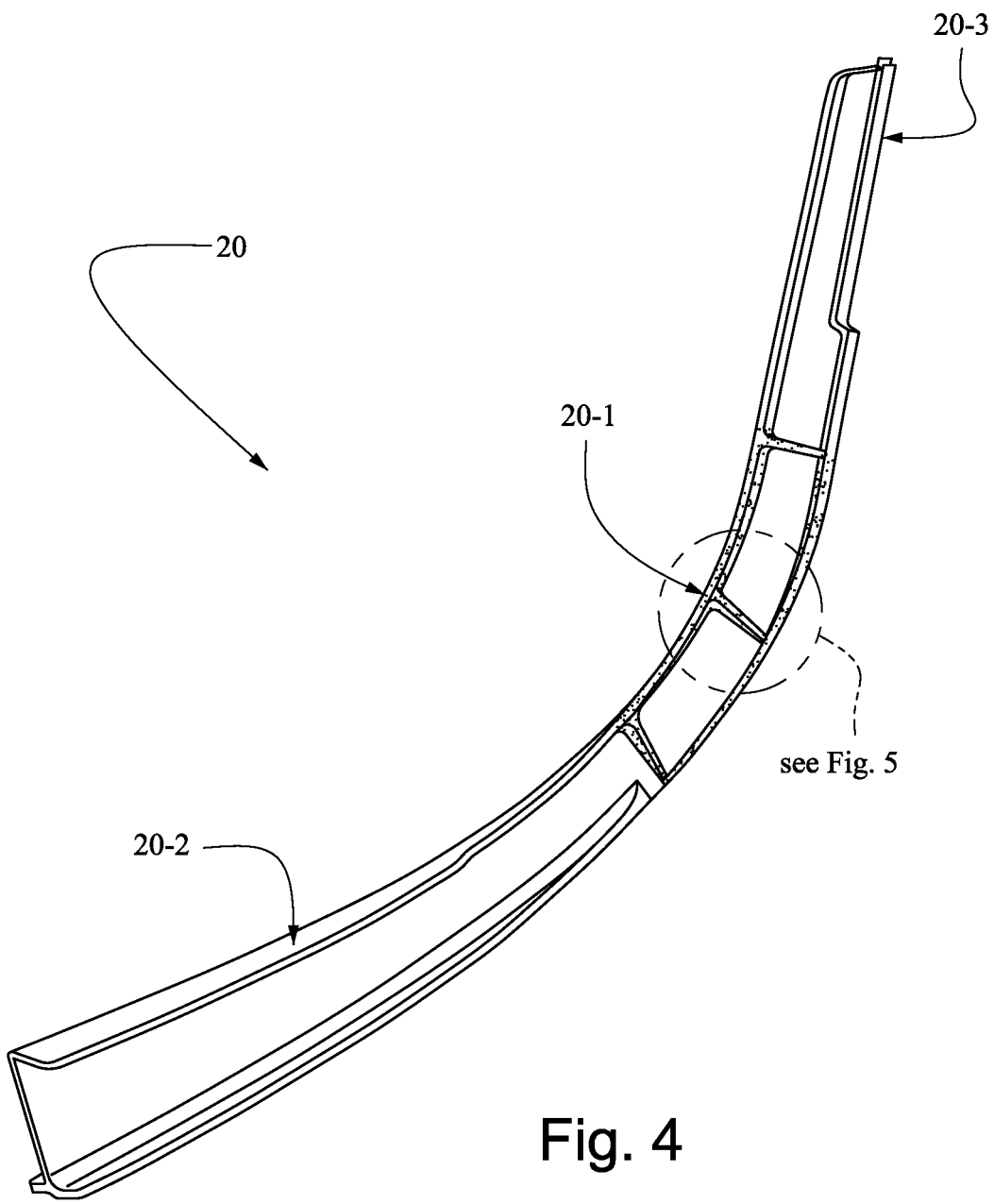
FIG. 4 is a detailed elevational view of a representative winglet spar employed in the aircraft winglet.

As is shown in greater detail in FIGS. 3 and 4, each of the winglet spars 20 will preferably include at least one thermally configurable region 20-1. In the embodiment depicted, the winglet spar 20 will also include inboard and outboard non-thermally configurable spar regions 20-2, 20-3, respectively, unitarily contiguous with the thermally configurable region. As such, the winglet spars 20 are embodied in a one-piece structural component which may include respective SMA region(s) (e.g., corresponding to region 20-1) which are unitarily contiguous with adjacent non-SMA regions (e.g., corresponding to region 20-2). According to certain embodiments, therefore, the thermally configurable region 20-1 is formed of a SMA material while the non-thermally configurable spar regions 20-2, 20-3 are formed of a non-SMA material. It will of course be understood that, while only one thermally configurable region 20-1 and inboard and outboard regions 20-2 and 20-3, respectively, are depicted in the exemplary embodiment of FIGS. 3 and 4, a different number and configuration of such regions may be provided in dependence upon the specific structural component design and its intended functionality.

Figure 5:
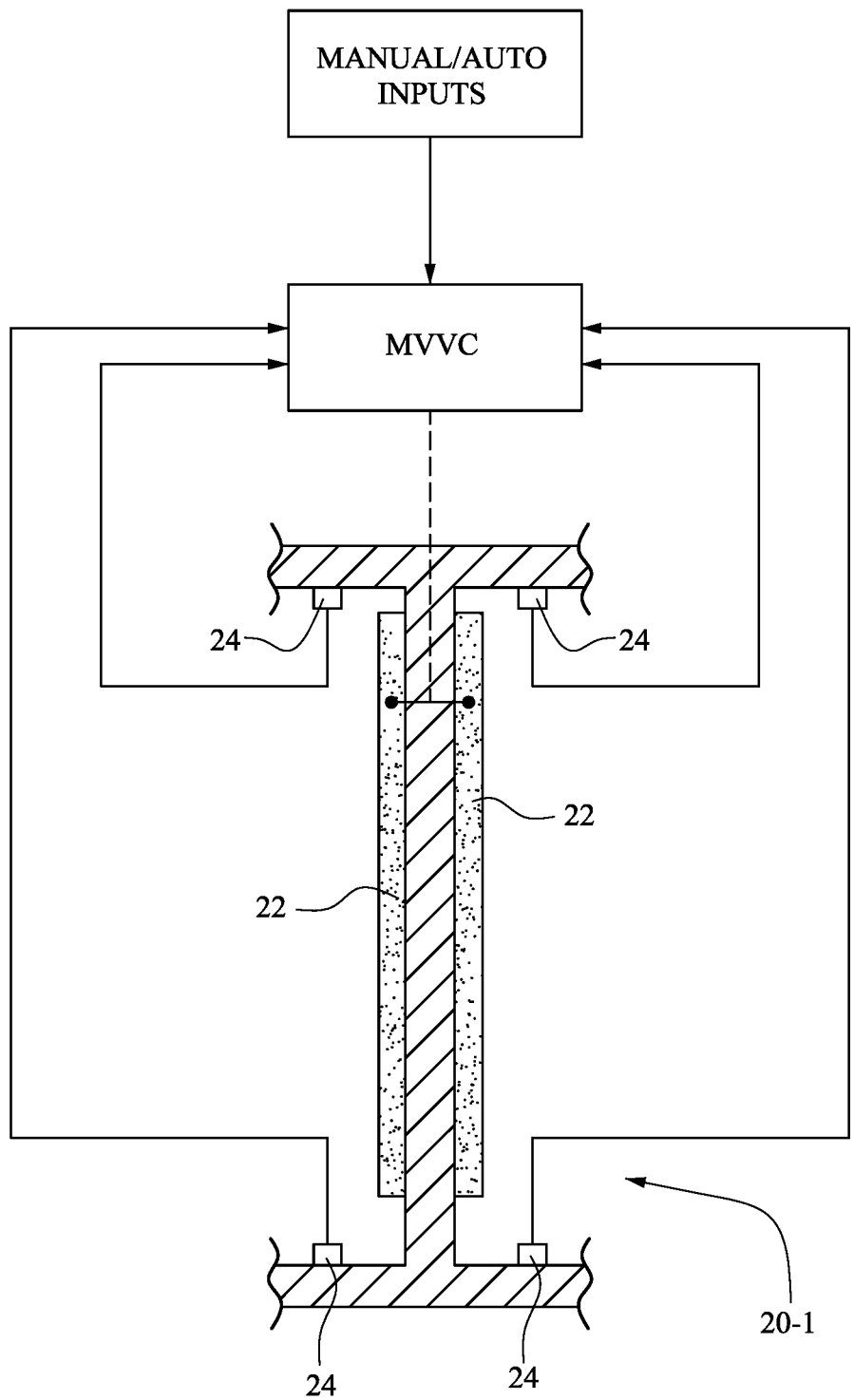
FIG. 5 is an enlarged schematic view of a portion of the winglet spar shown in FIG. 4 and the associated thermal control system to controllably move the wing spar in response to thermal input from the control system.

As is shown in FIG. 5, a system is provided to controllable morph the thermally configurable spar region 20-1 of the wing spar 20 to allow movement thereof as described previously. The system depicted in FIG. 5 includes one or more thermal actuators 22 in operative association (e.g., thermal contact) with the thermally configurable spar region 20-1 (e.g., in thermal contact with an interior spar member between the spar flanges as depicted). The thermal actuators 22 may be any conventional actuator which transfers thermal energy to the SMA material forming the thermally configurable region 20-1, e.g., using the on-board electrical energy of the aircraft AC. In especially preferred embodiments, the actuators may be embodied in the actuators as disclosed more fully in pending U.S. patent application Ser. No. 15/910,584 filed on Mar. 2, 2018 (the entire content of which is expressly incorporated hereinto by reference).

A plurality of sensors 24 are provided in operative association with the thermally configurable spar region 20-1 so as to determine temperature and/or position parameters of the thermally configurable region 20-1 and output such parameters to a multi-channel or multiplexed variable voltage controller MVVC. Manual (e.g., pilot-initiated) or automatic (e.g., computer-initiated based on aircraft performance data) input to the MVVC is provided in dependence upon the flight conditions and/or flight profile. The MVVC will therefore output signals to the thermal actuators 22 so as to cause the thermal actuators to quickly and controllably heat the thermally configurable spar region to achieve the desired angular orientations $\alpha$ and $\beta$ as described previously.

The SMA material forming the thermally configurable region 20-1 is in general a metallic alloy that exhibits structural deformation triggered by heat while remembering its original shape (i.e., a one-way shape memory effect). Upon heating and cooling cycles, the SMA can undergo large deformations without showing residual strains and can recover its original shape through thermal cycles (e.g., the shape memory effect). Such material behavior is due to the material microstructure with two different crystallographic structures, namely austenite and martensite. Austenite is the crystallographically more-ordered phase and higher modulus, while martensite is the crystallographically less-ordered phase and lower modulus. SMA materials will thereby exist as an austenite phase (the parent or memory phase) with long range order when subjected to elevated temperatures.

The thermally configurable regions 20-1 of the winglet spars 20 may be formed from virtually any metal alloy having shape memory characteristics. Although a relatively large variety of alloys exhibit the required shape memory effect, only those that can recover a substantial amount of deformation, or generate a significant force of restitution over shape change, are desirably employed in the embodiments disclosed herein. For example, suitable SMAs include Ni—Ti based alloys and Cu—based alloys such as Cu—Zn—Al, Cu—Al—Ni. More specifically, alloys of Ni—Ti, Ni—Al, Cu—Zn, Cu—Zn—Al, Cu—Zn—Sn, Cu—Zn—Si, Cu—Zn—Ga, Au—Cd, Fe—Pt, Mg—Cu, Fe—Mn—Si—Cr—Ni may satisfactorily be employed in the embodiments disclosed herein.

One of the most common shape memory alloys is NITINOL® alloy, an alloy of nickel and titanium (Ni—Ti) which was discovered in the 1960s at the U.S. Naval Ordnance Laboratory (NOL). The acronym NiTi—NOL (or NITINOL® alloy) is used herein to refer to Ni—Ti-based shape memory alloys where the mix of the nickel and titanium alters the material response.

In order to provide the desired deflection response characteristics (actuation range) of the spar 20 when heated, the thermally configurable regions 20-1 may consist solely of SMA (i.e., be formed of 100 wt. % SMA material (0 wt. % of other alloys) or may comprise SMA material in addition to at least one other alloy material. Such other alloy may be a non-SMA material (i.e., a material which does not exhibit shape memory characteristics) provided that the thermally activated shape-memory characteristics of the regions 20-1 is not adversely affected. Alternatively, the other alloy may be an alloy material that exhibits a superelastic (SE) effect. Such SE alloys are known and can be formed from the same alloys described hereinabove which provide for shape-memory effect (e.g., NITINOL® alloys), but heat-treated differently according to techniques known to those skilled in the art to enable the alloy to exhibit SE effects (i.e., a two-way shape memory effect). Thus, whereas the SMA material is thermally activated, SE alloy materials exhibit mechanical superelasticity in response to strain. At low temperatures, the SE alloy materials will exist as martensite, yet at elevated temperatures substantially at elevated temperatures, the SE ally material exists as austenite. At temperatures just above the transition temperature of the SE alloy material to austenite, an applied stress can be transform the austenite to martensite such that the material exhibits increasing strain at constant applied stress (i.e., considerable deformation occurs for a relatively small applied stress).

When such stress is removed, the martensite of the SE alloy material will revert to austenite and the material recovers to its original shape.

The SE alloy material is therefore capable of recovering from large structural displacements in the absence of being thermally activated. Moreover, such SE alloy material could possibly have a memorized shape in a curved position so that, upon changing the SMA material temperature (consequently changing its elastic modulus), the equilibrium between these the SMA material and the SE alloy materials will determine the actuation range of the region 20-1.

The SMA material and the other alloy material (e.g., the SE material) can be provided in the regions 20-1 as a homogenous admixture with one another or in the form of discrete areas (e.g., islands of SE alloy material in a sea of SMA material) depending on the particular structural component and the mechanical deflection characteristics that may be desired. By way of example, the SE alloy material may be present in the regions 20-1 in an amount of 0 to about 60 wt. %, based on the total weight of the SMA material in the regions 20-1, for example, from about 5 to about 50 wt. %, about 10 wt. % to about 40 wt. %, or about 20 wt. % to about 30 wt %. Thus, the SE alloy may be present in any amount that may be deemed necessary in order to achieve the desired structural deflection of the structural component including at least one of the regions 20-1, for example, less than about 60 wt. %, less than about 50 wt. %, less than about 40 wt. %, less than about 30 wt. %, less than about 20 wt. % or less than about 10 wt. %, based on the total weight of the SMA material in the region 20-1.

The non-SMA material forming the non-thermally configurable spar regions 20-2, 20-3 may be any alloy that does not exhibit shape memory effects. Thus, virtually any alloy conventionally employed in the aerospace industry, such as alloys of aluminum, titanium, magnesium and the like may be employed for such purpose.

In order to achieve a complex one-piece (unitary) structure, the winglet spars 20 are most preferably formed by an additive layer manufacturing (ALM) process, e.g., 3D printing. In this regard, metallic powders of the SMA and non-SMA materials may be "printed" using laser sintering according to a computer-aided design of the structural component being fabricated, e.g., as described more completely in U.S. Pat. Nos. 9,388,078 and 10,065,240 (the entire contents of each such prior issued patent being expressly incorporated hereinto by reference). As is known, a complete structural component can be designed with a 3D computer model which then aids the ALM process in a layer-by-layer additive manner. That is, a thin layer of alloy powder may be spread onto a supporting tray so as to then be laser-sintered based on a first slice of the computer-aided 3D model. Subsequent layers corresponding to successive slices of the 3D model will then be laser-sintered in a similar manner until the complete structural component is manufactured. As can be appreciated, therefore, the regions 20-1, 20-2 and 20-3 can be fabricated by providing different SMA and non-SMA material powders in dependent upon the design of the winglet spar 20 during the ALM process.

When employing NITINOL® SMA, the desired shape may be imposed onto the thermally configurable region 20-1 by annealing and/or isostatically pressed at a relatively high temperature (e.g., above 700° C.). The region 20-1 formed of NITINOL® SMA may thereby be trained into the desired shape at about 500° C. for at least 25 minutes. The completed 3D printed spar 20 may, for example, be fabricated as a one-piece (unitary) structural component using laser-sintered powders of SMA and non-SMA materials as described hereinabove and then thermally trained by annealing and/or isostatically pressing at elevated temperatures. If SE alloy materials are employed in combination with SMA materials for the thermally configurable regions, then it is possible to employ the same alloy but to operate the 3D laser sintering parameters appropriately so as to impart SE characteristics to certain sintered layers, elements or regions forming the thermally activated region 20-1. For example, a different temperature and/or heat treatment time may be employed so as to trigger different crystallographic structures within region 20-1 so as to allow either shape-memory or super-elastic effects to be realized.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method of making a thermally configurable aircraft structural component capable of assuming at least first and second structural configurations which include at least one thermally configurable region comprised of sintered shape memory alloy (SMA) particles, and at least one non-thermally configurable region comprised of sintered non-SMA particles which is unitarily contiguous with the at least one thermally configurable region, wherein the method comprises:
   (i) additively sintering layers of sinterable SMA particles to form the at least one thermally configurable region of the component comprised of the sintered SMA particles; and
   (ii) additively sintering layers of sinterable non-SMA particles to form the at least one non-thermally configurable region of the component comprised of the sintered non-SMA particles, wherein
steps (i) and (ii) are practiced simultaneously or in any order.

2. The method according to claim 1, wherein steps (i) and/or (ii) include additively sintering by 3D laser-sintering.

3. The method according to claim 1, wherein the process comprises the steps of:
   (a) providing a sinterable powder layer comprised of unitarily contiguous adjacent powder regions which respectively include the SMA and non-SMA particles,
   (b) laser-sintering the sinterable powder layer to form a sintered powder layer which includes the unitarily contiguous thermally configurable and non-thermally configurable regions, respectively, and thereafter
   (c) repeating steps (a) and (b) for a plurality of successively adjacent sintered powder layers.

4. The method according to claim 1, which further comprises thermally training the aircraft structural component.

5. The method according to claim 4, wherein the step of thermally training the aircraft structural component includes annealing and/or isostatically pressing the aircraft structural component at elevated temperatures.

6. The method according to claim 1, wherein step (i) comprises additively sintering sinterable powder layers comprised of the sinterable SMA particles and sinterable superelastic (SE) alloy particles.

7. The method according to claim 6, which comprises forming the sinterable powder layers by admixing the sinterable SMA and sinterable SE alloy particles with one another.

8. The method according to claim 1, wherein the sinterable SMA particles are comprised of Ni—Ti based alloys and/or Cu-based alloys.

9. The method according to claim 1, wherein the sinterable SMA particles are shape memory alloys selected from the group consisting of Ni—Ti, Ni—Al, Cu—Zn, Cu—Zn—Al, Cu—Zn—Sn, Cu—Zn—Si, Cu—Zn—Ga, Au—Cd, Fe—Pt, Mg—Cu and Fe—Mn—Si—Cr—Ni.

10. The method according to claim 1, wherein the sinterable non-SMA particles are non-shape memory alloys selected from the group consisting of aluminum alloys, magnesium alloys and titanium alloys.

11. The method according to claim 1, wherein the sinterable SMA particles are formed of a shape memory Ni—Ti alloy, and wherein the sinterable non-SMA particles are formed of a non-shape memory aluminum alloy.

12. The method according to claim 1, wherein the aircraft structural component is a winglet spar for an aircraft winglet.

13. The method according to claim 12, wherein the at least one thermally configurable region of the winglet spar is capable of causing the winglet to assume at least two different aerodynamic configurations in response to presence or absence of a thermal input, respectively.

14. The method according to claim 13, wherein the at least two different aerodynamic configurations comprise different angular orientations relative to lengthwise and/or chordwise extents of an aircraft wing.

15. A method of fabricating a one-piece aircraft winglet spar having unitarily contiguous thermally configurable and non-thermally configurable regions, wherein the method comprises the steps of:
(a) providing a sinterable powder layer comprised of unitarily contiguous adjacent powder regions which respectively include shape memory alloy (SMA) particles and non-SMA particles,
(b) laser-sintering the sinterable powder layer to form a sintered powder layer which includes the unitarily contiguous thermally configurable and non-thermally configurable regions, respectively, and thereafter
(c) repeating steps (a) and (b) for a plurality of successively adjacent sintered powder layers to thereby form the one-piece winglet spar comprised of a thermally configurable region comprised of the SMA particles sintered according to step (b), and a non-thermally configurable region comprised of the non-SMA particles sintered according to step (b) which is unitarily contiguous with the thermally configurable region.

* * * * *